United States Patent
Hébert et al.

(10) Patent No.: US 11,588,629 B2
(45) Date of Patent: Feb. 21, 2023

(54) SECURE, DECENTRALIZED, AUTOMATED PLATFORM AND MULTI-ACTORS FOR OBJECT IDENTITY MANAGEMENT THROUGH THE USE OF A BLOCK CHAIN TECHNOLOGY

(71) Applicant: BULL SAS, Paris (FR)

(72) Inventors: Guillaume Hébert, Lyons (FR); David Leporini, Rungis (FR)

(73) Assignee: BULL SAS, Les Clayes-sous-Bois (FR)

( * ) Notice: Subject to any disclaimer, the term of this patent is extended or adjusted under 35 U.S.C. 154(b) by 52 days.

(21) Appl. No.: 17/122,135

(22) Filed: Dec. 15, 2020

(65) Prior Publication Data
US 2021/0234675 A1 Jul. 29, 2021

(30) Foreign Application Priority Data
Dec. 16, 2019 (FR) ...................................... 1914489

(51) Int. Cl.
*H04L 9/08* (2006.01)
*H04L 9/30* (2006.01)
(Continued)

(52) U.S. Cl.
CPC .............. *H04L 9/0861* (2013.01); *H04L 9/30* (2013.01); *H04L 9/3218* (2013.01); *H04L 9/3271* (2013.01); *H04L 9/50* (2022.05)

(58) Field of Classification Search
CPC ....... H04L 9/0861; H04L 9/30; H04L 9/3218; H04L 9/3221; H04L 9/50
See application file for complete search history.

(56) References Cited

U.S. PATENT DOCUMENTS 10,673,617 B1\* 6/2020 Antoniou ............ G06F 13/4282
11,063,760 B2\* 7/2021 Subba ..................... H04L 9/085
(Continued)

OTHER PUBLICATIONS

Search Report and Written Opinion issued in FR1914489, dated Aug. 28, 2020 (8 pages).
(Continued)

*Primary Examiner* — Darshan I Dhruv
(74) *Attorney, Agent, or Firm* — Arc IP Law, PC; Joseph J. Mayo (57) ABSTRACT

A communication method for the secure management of keys and identities of an Object manufactured by a Manufacturer having a Manufacturer key pair ($Ks_{man}$, $Kp_{man}$) and a client having a Client key pair ($Ks_{client}$, $Kp_{client}$), that is carried out at least partially on a decentralized blockchain database by generating by the Manufacturer two diversified symmetric keys from its key pair and from diversifiers, sharing keys with the object, publishing and recording the decentralized identifier (DID) in the database, wherein when a Client purchases the object from the Manufacturer, providing the identifier of the object DID by the Manufacturer, updating the blockchain, when the object is initially switched on, auto-enrolling by generating new symmetric keys, sending two new encrypted diversifiers to the client with the public client key, publishing and recording new encrypted diversifiers with the public client key in the blockchain.

10 Claims, 4 Drawing Sheets

(51) Int. Cl.
*H04L 9/32* (2006.01)
*G06F 16/23* (2019.01)
*H04L 9/00* (2022.01)

(56) References Cited

U.S. PATENT DOCUMENTS

| | | | | |
|---|---|---|---|---|
| 2016/0366102 | A1* | 12/2016 | Smith | H04L 9/0841 |
| 2018/0097635 | A1* | 4/2018 | Moses | H04L 9/3236 |
| 2019/0163912 | A1* | 5/2019 | Kumar | G06F 16/27 |
| 2019/0222424 | A1* | 7/2019 | Lindemann | H04L 9/3231 |
| 2021/0091960 | A1* | 3/2021 | Werner | H04L 9/50 |

OTHER PUBLICATIONS

Won, et al., "Decentralized Public Key Infrastructure for Internet of Things", Milcom 2018—2018 IEEE Military Communications Conference, IEEE, Oct. 29, 2018 (7 pages).

Menezes, et al., "Chapter 12: Key Establishment Protocols ED—Menezes A J; Van Oorschot PC; Vanstone S"; Handbook of Applied Cryptography; CRC Press Series on Discrete Mathematics and its Applications, pp. 489-541 (1996).

\* cited by examiner

SECURE, DECENTRALIZED, AUTOMATED PLATFORM AND MULTI-ACTORS FOR OBJECT IDENTITY MANAGEMENT THROUGH THE USE OF A BLOCK CHAIN TECHNOLOGY

TECHNICAL FIELD OF THE INVENTION

The present invention generally relates to the field of Identity and Access Management, and more particularly to secure automated access by objects to digital services and the protection of the ensuing exchanges.

PRIOR ART

We are currently witnessing immense growth of the Internet of Things (IoT) and the securing of these things (objects). One estimate of the market gives 30 billion as the number of objects connected to the IoT by 2020. This is why it is important to find IoT solutions that meet scalability requirements in order to respond to demand, but also to security aspects, in order to be protected against cyberattacks. The security requirements associated with the communications of the objects (confidentiality, integrity, authentication and non-repudiation) are covered by the use of cryptographic mechanisms which are based on sets of keys and digital identities. This key and identity manager thus represents the core of the system's security. From the perspective of the objects, it is due to this manager that the object is authorized to transmit on a network and to access an application service (identification and authentication of the object), that it is able to transmit encrypted, integral and authenticated messages and that it is capable of decrypting the data received (symmetric/asymmetric cryptography).

The secure automated access by objects to digital services, and the protection of the ensuing exchanges, require establishing enrollment processes both for the manufacturers of objects and for the objects themselves, as well as linking them up with the digital services in question ("service on-boarding").

These processes must respond to issues such as the identification of the objects with a list of associated attributes (including in particular security identifiers such as cryptographic keys) and the storage thereof in a repository of the Manufacturer of the objects; transferring the ownership and/or operating rights of an object from a Manufacturer to a user of the object (for example a service provider using the object); transferring the ownership and/or operating rights from one user to another (a case, for example, of the need for reversibility); updating the attributes associated with the identity of the object by the owner of an object and/or the entity in charge of its operating rights.

Moreover, the platforms which respond to these processes must demonstrate a high degree of fault resilience, high availability and strong security.

With the rise in connected objects (IoT), in particular small and inexpensive IoT objects, new constraints specific to these objects are emerging, such as small memory size, low computing power, low consumption and a possible offline mode or disconnection of the object.

In addition to all these technical constraints there are increasing legal constraints, such as new regulations in force regarding data ownership (GDPR) and Privacy by Design (PvD).

There are currently several solutions to respond to these issues, for example IAM solutions (Identity and Access Management). Numerous cybersecurity companies offer such solutions: Active Directory, IBM Security Identity and Access Assurance, Oracle Identity Cloud Service, Okta, Centrify, RSA SecurID Access, Keeper Security, SailPoint, OneLogin, Ping, etc. Nonetheless, the various stakeholders in this list offer centralized solutions with internal storage of data which may be of a personal nature, therefore sensitive, and thus may no longer comply with GDPR regulations.

These solutions generally propose a centralized technical process, usually managed by the service provider, which does not enable automation, and prior bilateral agreements between the service providers and the object manufacturers, necessary to enable the linking up of the objects to the provider's services.

The object is already recorded and "paired with its Manufacturer/Owner".

Finally, these solutions call for sufficiently large computing and storage capacities in the object in order to manage the security requirements of identification and authentication using public cryptographic keys/electronic certificates. These requirements for computing power, storage space and energy expenditure may not be managed by some IoT objects which have too low a computing power and too small a battery for this.

DISCLOSURE OF THE INVENTION

The object of the present invention is therefore to propose a communication method for the secure management of keys and identities, making it possible to overcome at least some of the disadvantages of the prior art.

This aim is achieved by a communication method for the secure management of keys and identities of an Object manufactured by a Manufacturer having a Manufacturer's key pair public key Kp, private or secret key Ks ($Ks_{man}$, $Kp_{man}$), and a client having a Client key pair ($Ks_{client}$, $Kp_{client}$), characterized in that the management is carried out at least partially on a decentralized blockchain database, and that the method comprises the following steps:

a) Generation, by the Manufacturer, of two diversified symmetric keys from its key pair and from diversifiers, for example in the form of 128 bit AES keys, the two symmetric keys being composed of a confidentiality key $K0c$ and an identity key $K0i$, then sharing of said keys with the object.

b) Publication and recording, in the blockchain database, of the decentralized identifier (DID) of the object and preferentially of the diversifier encryption used to obtain the two symmetric keys by a public key $Kp_{man}$: and association of the pair identifying the object with the encryption of the public key $Kp_{man}$ and encrypted diversifiers in order to form the information DID-Enc($Kp_{man}$,$DIV_c$||DIV_ID)

And, when a Client purchases the object from said Manufacturer, the method comprises the following initialization steps:

c) Providing, by the Manufacturer of the object, of the identifier of the object DID, and of the symmetric keys confidentiality key $K0c$ and identity key $K0i$, the symmetric keys being encrypted by the public client key $kp_{client}$, to the client, preferentially by a mechanism outside of the blockchain, referred to as "off-chain";

d) Updating the blockchain of the database by publication, and association in said blockchain, of the pair identifying the object (DID) with the public client key $Kp_{client}$ and the encryption of the public client key $kp_{client}$ and the encrypted diversifiers in order to form the information DID-$kp_{client}$ and Enc($Kp_{client}$,$DIV_c$||DIV_ID) so that the client is able to recalculate the values of the object keys. And, when the object is switched on for the first time, the object auto-enrolls according to the following steps:

e) Generation of its new symmetric keys, confidentiality key $K1c$ and Identity key $K1i$, by diversification of its former keys $K0c$, $K0i$;

f) Auto-enrollment of the object is carried out by a cryptographic challenge implementing the identity key g) Sending, by the object to the client, of the two new encrypted diversifiers with the public client key, the sending being carried out by a mechanism outside of the blockchain, referred to as "off-chain"

h) Publication and recording of said new encrypted diversifiers with the public client key in the blockchain.

According to a particular feature, the method further comprises a step prior to the generation of the manufacturing key pairs by the Manufacturer, wherein said Manufacturer records their Manufacturer identifier in the blockchain and publishes their public Manufacturer key ($Kp_{man}$) by associating it with its Manufacturer identifier.

According to another particular feature, the key pair generator is based on Hierarchical Key Wallets to provide the unique manufacturing key pairs which are diversified from the Manufacturer key pair.

According to another particular feature, the two symmetric keys generated by the Manufacturer result from the IES scheme (Integration Encryption Scheme) or from the ECIES scheme (Elliptic Curve Integrated Encryption Scheme), preferentially from the ECIES scheme, and where the Manufacturer generates a temporary key pair, the public part of which is used by said Manufacturer for deriving said two generated symmetric keys.

According to another particular feature, the object is transferred from one owner to another by reiterating steps d to e.

According to another particular feature, sharing or managing the rights to the object is performed by the owner of the object by means of Verifiable Credentials, preferentially requested by the Service Providers and validated by the owner.

According to another particular feature, a Zero Knowledge Proof (ZKP) system is established within a Smart Contract, in order to give information without revealing the values thereof.

The present invention also relates to a system for managing secure identities based on a blockchain able to carry out the steps of a process performing:

The identification of the objects with a list of associated attributes, including in particular security identifiers such as cryptographic keys, and recording thereof in a repository of the Manufacturer;

The transfer of ownership and/or operating rights of an object from a Manufacturer to a user of the object, for example a service provider using the object, by recording new identities associated with the object;

The transfer of ownership and/or operating rights from one user to another, by recording new identities associated with the object;

The updating of attributes associated with the identity of the object by the owner of an object and/or the entity in charge of its operating rights.

The present invention also relates to a database, used by the system for managing secure identities based on a blockchain, implemented on a secure, decentralized, automated and multi-stakeholder platform for object identity management through the use of blockchain technology implemented on several nodes of the system with which the platform communicates, the nodes being responsible for maintaining the blockchain and enabling the stakeholders, and the objects, to look up the state of this chain and to interact with this chain via a common shared repository (or register), each node having access to a cryptographic module which is preferably physical, in charge of the secure storage of its private key and of the access to the shared register, characterized in that the database constitutes a repository for each manufacturer containing a list of associated attributes, including in particular security identifiers such as cryptographic keys, and either carrying out the recording thereof in the repository of the Manufacturer or carrying out the update of the attributes associated with the identity of the object by the owner of an object and/or the entity in charge of its operating rights.

The present invention also relates to a secure, decentralized, automated and multi-stakeholder platform for object identity management using a database, characterized in that it manages:

The transfer of ownership and/or operating rights of an object;

The recording of proof of object possession in the shared repository;

The activation/reactivation of objects;

According to a particular feature, the blockchain technology used does not have to be of a specific type and comprises at least:

a permission system for identifying and strongly authenticating a stakeholder;

an access control system based on the identities of the users;

an anti-replay mechanism, each node maintaining the blockchain having to be located in a secure environment, and the public identity of each node has to be made available to the other nodes and stakeholders within the shared register; the execution of Smart Contract and functions on the blockchain being performed in this secure environment, the ultimate aim of the recording being to create a link, accessible by everyone in the blockchain, in order to make it possible to match the stakeholder and their digital identity by a key pair (public key and private key) or by a certificate, optionally signed by a certified identity management body.

The present invention also relates to a system for managing secure identities based on a blockchain and able to carry out the steps of a communication method for the secure management of keys and identities, the system comprising at least:

a Manufacturer, using a key diversification system based on diversifiers generated by a diversifier generator, a system for connecting to a blockchain, a system for attributing an identifier to each object leaving manufacturing, and a hardware and software arrangement in order to send, to the blockchain server, a message of publication and of recording of the association DID-Enc($Kp_{man}$,$DIV_c$||DIV_ID).

The present invention also relates to a system for managing secure identities based on a blockchain able to carry out the steps of a communication method for the secure management of keys and identities, the system comprising at least An object provided with computation means and means for storing in memory a program and sufficient data to carry out the following operations: when the object is switched on for the first time, the object auto-enrolls according to the following steps:

Generation of its new symmetric confidentiality key K1c and Identity key K1i by diversification of its former keys K0c, K0i Auto-enrollment by a cryptographic challenge implementing the identity key K0i Sending, by the object to the client, of the two new encrypted diversifiers with the public client key, the sending being carried out by a mechanism outside of the blockchain database, Publication and recording of said new encrypted diversifiers with the public client key in the blockchain database According to another particular feature, a system for sharing confidentiality keys is established "off chain" in order for service operators to have access to the object and therefore to the related information.

The present invention also relates to an identity management system of an identity (ID) service provider, implementing a blockchain and using the objects recorded on a network to fulfill application services (AS) in which the information provided by the objects are used, each node of the network of the identity service provider has access to a cryptographic module responsible for the secure storage of the private key of said node, the nodes having clients referred to as Stakeholders, each having their own identity $ID_{act}$ recorded in the blockchain, each object manufacturer is recorded in the blockchain of the identity service provider and the public manufacturing keys of the manufacturers are known to everybody; for each object sold or transferred, each manufacturer provides the identifier of the object and the encryption of the diversifiers used by the manufacturer for the calculation of the symmetric key pairs of each object by publishing in the blockchain, only the symmetric keys remain stored outside of the chain, in this instance in the object;

Each object being provided with computation means and means for storing in memory a program and sufficient data to execute the following operations: when the object is switched on for the first time, the object auto-enrolls with the identity service provider by carrying out the following steps:

Generation, in the object, of its new symmetric keys, confidentiality key K1c and Identity key K1i, by diversification of its former keys K0c, K0i;

Auto-enrollment by a cryptographic challenge implementing the identity key.

Sending, by the object to the client, of the two new encrypted diversifiers with the public client key, the sending being carried out by a mechanism outside of the blockchain, Publication and recording of said new encrypted diversifiers with the public client key in the blockchain.

The present invention also relates to an object, being provided with computation means and means for storing in memory a program and sufficient data to execute the following operations: when the object is switched on for the first time, the object auto-enrolls with the identity service provider by carrying out the following steps:

Generation, in the object, of its new symmetric keys, confidentiality key K1c and Identity key K1i, by diversification of its former keys K0c, K0i Auto-enrollment by a cryptographic challenge implementing the identity key.

Sending, by the object to the client, of the two new encrypted diversifiers with the public client key, the sending being carried out by a mechanism outside of the blockchain, Publication and recording of said new encrypted diversifiers with the public client key in the blockchain.

BRIEF DESCRIPTION OF THE FIGURES

Other features, details and advantages of the invention will emerge from reading the following description, with reference to the appended figures, wherein.

DETAILED DESCRIPTION OF THE INVENTION

Numerous combinations can be contemplated without departing from the scope of the invention: the person skilled in the art will choose one or the other based on economic, ergonomic or size constraints or other constraints they have to comply with.

Generally speaking, the present invention comprises a communication method for the secure management of keys and identities of an Object manufactured by a Manufacturer having a Manufacturer key pair public key Kp, private or secret key Ks ($Ks_{man}$, $Kp_{man}$), and a client having a Client key pair ($Ks_{client}$, $Kp_{client}$), characterized in that the management is carried out at least partially on a decentralized blockchain database, and that the method comprises the following steps:

a) Generation, by the Manufacturer, of two diversified symmetric keys from its key pair and from diversifiers, for example in the form of 128 bit AES keys, the two symmetric keys being composed of a confidentiality key K0c and an identity key K0i, then sharing of said keys with the object.

b) Publication and recording, in the blockchain database, of the decentralized identifier (DID) of the object and preferentially of the diversifier encryption used to obtain the two symmetric keys by a public key $Kp_{man}$: and association of the pair identifying the object with the encryption of the public key $Kp_{man}$ and encrypted diversifiers in order to form the information DID-Enc($Kp_{man}$,$DIV_c$||DIV_ID)

And, when a Client purchases the object from said Manufacturer, the method comprises the following initialization steps:

c) Providing, by the Manufacturer of the object, of the identifier of the object DID, and of the symmetric keys confidentiality key K0c and identity key K0i, the symmetric keys being encrypted by the public client key $kp_{client}$, to the client, by a mechanism outside of the blockchain, referred to as "off-chain";

d) updating the blockchain of the database by publication, and association in said blockchain, of the pair identifying the object (DID) with the public client key $Kp_{client}$ and the encryption of the public client key $kp_{client}$ and the encrypted diversifiers in order to form the information DID-$kp_{client}$ and Enc($Kp_{client}$,$DIV_c$||DIV_ID) so that the client is able to recalculate the values of the object keys.

In some embodiments, in the method, when the object is switched on for the first time, the object auto-enrolls according to the following steps:

e) Generation of its new symmetric keys, confidentiality key K1c and Identity key K1i, by diversification of its former keys K0c, K0i.;

f) Auto-enrollment of the object is carried out by a cryptographic challenge implementing the identity key g) Sending, by the object to the client, of the two new encrypted diversifiers with the public client key, the sending being carried out by a mechanism outside of the blockchain, referred to as "off-chain"

h) Publication and recording of said new encrypted diversifiers with the public client key in the blockchain.

Advantageously, the first key, referred to as confidentiality key K0c, being necessary for the encryption of the data, and the second key, identity key K0i, being necessary for the authentication on the blockchain.

These keys may result from the IES scheme (Integration Encryption Scheme), where preference will be given to using the ECIES scheme (Elliptic Curve Integrated Encryption Scheme), which is better suited to the IoT than the DLIES scheme (Discrete Logarithm Integrated Encryption Scheme). In this instance, the Manufacturer is forced to generate a temporary key pair and to use the public part for the derivation. These two symmetric keys are calculated by a key derivation function which takes as argument the temporary public key gt generated by the Manufacturer and derived from the Manufacturer key pair ($g^f$,f) by a diversifier.

In other words, in this embodiment, a temporary public key is randomly generated by the manufacturer. It is derived from two objects: the manufacturer key pair and a diversifier. The result of the derivation with a first diversifier is a new object: a symmetric confidentiality key K. The result of the derivation with a second diversifier is a new object: a symmetric identity key K.

In some embodiments, each publication in the blockchain is equivalent to at least one transaction therein.

The diversifier DIV could be not published in the Blockchain, but for security reasons it is. Indeed, this enables the Manufacturer to not store the manufacturing Key pair, and to thus be obliged to recalculate it if needed.

There is a relationship which makes it possible to associate the DID and the DIV. Thus, any stakeholder is capable of finding the DIV if they know the DID. The DIV is necessary as it enables the manufacturer to recalculate the key: DIV for diversifier. A diversified key is obtained from a key and a diversifier: the key is known to the manufacturer and the diversifier is stored in the blockchain.

In some embodiments, the encryption of the diversifiers is carried out with the public manufacturing key (only the manufacturer, who has the private key, can thus decrypt).

The proof of ownership of the object is intrinsic, since the owner/manufacturer is the only one to possess the private key associated with the public key referenced.

Advantageously, the object is capable of enrolling itself and signs the enrollment message with the manufacturing key ($Ks_{fab}$), which it is the only one to have.

In some embodiments, the provision of the data, in particular of the object identifier DID, and of the encrypted symmetric keys, confidentiality key K0c and identity key K0i, is carried out by off-chain transmission.

"Off-chain" provision or sending of data is understood to mean providing or sending data by a mechanism outside the blockchain, in order to improve the security and confidentiality of particularly sensitive data. This means, for example, secure sending by mail, making available on a secure storage server, sending a USB stick with secure data, or else other possible means conceivable to a person skilled in the art which respond to the stated issue.

Alternatively, it would be possible, but less secure, to send the new diversifiers during step e) directly to the Smart Contract which encrypts them with the public client key.

The mechanism would absolutely have to secure these diversifiers: encryption of the data by the sender with the public key of the recipient, for example.

Advantageously, the encryption of the symmetric keys is carried out by the Manufacturer.

Advantageously, the replacement (updating), i.e. the publication and recording in the blockchain, is carried out by updating the blockchain via a transaction. The blockchain is like a status register: updating the status of a value, therefore replacement via a transaction. The former status is kept (blockchain paradigm) but is no longer up to date.

In some embodiments, the object accesses the shared register via the node of its Manufacturer, with its identity key K0i which gives it the necessary rights to perform the enrollment process. This symmetric key is known only to the Manufacturer, to the object and to the Client, the object is authenticated by the Blockchain: the verification is performed by the Smart Contract, via a challenge which can only be carried out by the sole bearers of the identity key K0i (e.g. using an HMAC-type mechanism).

A cryptographic challenge is an authentication mechanism which implements a secret, in this case a key. The mentioned HMAC function makes it possible to authenticate the sender of an item of data and to ensure the integrity of the data.

Decentralized "blockchain" database is understood to be a decentralized database comprising a network of chains of blocks, with nodes comprising all or part of the blockchain register. Advantageously, in order to keep track of all the transactions, the blockchain network uses the multi-chain register which is replicated on all the homologous nodes of the blockchain network. The blockchain is a list of blocks each containing several transactions. Each block has a pointer to the previous block and the contents of the blocks are protected by hash signatures. The bitcoin operating nodes build new blocks from incoming transactions. This building is made difficult to carry out and requires considerable mining calculations, proof of work. The effort expended also makes it just as difficult to change blocks already included in the blockchain, all the more so since changing a block in the middle of the chain would require recreating all the following blocks. Thus, the blockchain register is well protected from modifications and can be considered to be a permanent record of the transactions. In order to encourage the mining effort, miners are remunerated with the bitcoins, newly created when a block is created. They also receive all the transaction fees of the transactions included in the new block.

Blockchain technology is used as a shared and distributed repository of identities including a list of associated public attributes. These identities may, by way of illustration, use the format DID defined in the specification, "Decentralized Identifiers (DIDs)".

The system is preferentially not based on a public blockchain, and not on a blockchain with proof of work, which requires computing power and energy in the case of IoT usage (some objects having low-consumption and low computing power constraints). On the contrary, the solution is preferentially based on a consortium blockchain/company blockchain/permission blockchain/POK (Proof of Knowledge) blockchain.

The invention relates to a secure, decentralized, automated and multi-stakeholder platform for object identity management through the use of a blockchain technology. In other words, on a blockchain system, in order to benefit from its advantages: scalability, replication, resilience to faults/attacks, while adding an additional layer for the IAM and the GIA connected to the identity of the entities.

These embodiments therefore do not require additional stakeholders or additional servers, only the direct stakeholders (Manufacturer, Client, Object), a decentralized blockchain database, and potentially a service provider. Advantageously, the nodes of the blockchain are only used to store data and update it via transactions carried out on said blockchain.

Some solutions provide for the presence of a DM (Device Manager), while in the present system, the recording has already been carried out and the enrollment on the network is initiated by the object. The object autonomous by virtue of the DID.

In some embodiments, the method further comprises a step prior to the generation of the manufacturing key pairs by the Manufacturer, wherein said Manufacturer records their Manufacturer identifier in the blockchain and publishes their public Manufacturer key ($Kp_{man}$) by associating it with its Manufacturer identifier.

In some embodiments, the key pair generator is based on Hierarchical Key Wallets to provide unique manufacturing key pairs which are diversified from the Manufacturer key pair.

In some embodiments, the two symmetric keys generated by the Manufacturer result from the IES scheme (Integration Encryption Scheme) or from the ECIES scheme (Elliptic Curve Integrated Encryption Scheme), preferentially from the ECIES scheme, and where the Manufacturer generates a temporary key pair, the public part of which is used by said Manufacturer for deriving said two generated symmetric keys.

In some embodiments, the object is transferred from one owner to another by reiterating steps d to e.

In some embodiments, sharing or managing the rights to the object is performed by the owner of the object by means of Verifiable Credentials, preferentially requested by the Service Providers and validated by the owner.

The Verifiable Credentials and the DID Documents (Decentralized Identifier), will be used, respectively, as access control means and storage format for the information associated with the object on the blockchain. The former making it possible to provide read access to the information of the object based on the identity of the pair.

In some embodiments, in the method, a Zero Knowledge Proof (ZKP) system is established within a Smart Contract, in order to give information without revealing the values thereof.

ZKP is a method which enables an entity to prove to another that a proposition is true without revealing the value thereof. For the purpose of data conservation, this makes it possible to answer a question without revealing the value.

For example, a service may ask an object if its temperature is less than or greater than 0° C. without the object having to reveal the value of its temperature. This thus enables optimization of the use of the service, and not in the steps.

Smart Contract is understood as a single and replicated digital protocol/program which makes it possible to perform operations on the blockchain, while complying with well-defined rules.

Thus, all the writes/publications into the blockchain go via Smart Contracts. The access rules are also managed by Smart Contracts.

Various embodiments described also relate to a system for managing secure identities based on a blockchain.

Thus, in some embodiments, a system for managing secure identities based on a blockchain is able to carry out the steps of a process performing:
- The identification of the objects with a list of associated attributes, including in particular security identifiers such as cryptographic keys, and recording thereof in a repository of the Manufacturer;
- The transfer of ownership and/or operating rights of an object from a Manufacturer to a user of the object, for example a service provider using the object, by recording new identities associated with the object;
- The transfer of ownership and/or operating rights from one user to another, by recording new identities associated with the object;
- The updating of attributes associated with the identity of the object by the owner of an object and/or the entity in charge of its operating rights.

Thus, a secure, decentralized, automated and multi-stakeholder platform or system may be established for object identity management through the use of a blockchain technology, enabling secure automated access by objects to digital services and the guarantee of protection of the ensuing exchanges.

Various embodiments described also relate to a database used by the system for managing secure identities based on a blockchain.

Thus, some embodiments relate to a database, used by the system for managing secure identities based on a blockchain, implemented on a secure, decentralized, automated and multi-stakeholder platform for object identity management through the use of blockchain technology implemented on several nodes of the system with which the platform communicates, the nodes being responsible for maintaining the blockchain and enabling the stakeholders, and the objects, to look up the state of this chain and to interact with this chain via a common shared repository (or register), each node having access to a cryptographic module which is preferably physical, in charge of the secure storage of its private key and of the access to the shared register, characterized in that the database constitutes a repository for each manufacturer containing a list of associated attributes, including in particular security identifiers such as cryptographic keys, and either carrying out the recording thereof in the repository of the Manufacturer or carrying out the update of the attributes associated with the identity of the object by the owner of an object and/or the entity in charge of its operating rights.

Various embodiments described also relate to a secure, decentralized, automated and multi-stakeholder platform for object identity management using a decentralized database.

In some embodiments, a secure, decentralized, automated and multi-stakeholder platform for object identity management using a decentralized database manages:
- The transfer of ownership and/or operating rights of an object;
- The recording of proof of object possession in the shared repository;
- The activation/reactivation of objects;

In some embodiments, the blockchain technology used does not have to be of a specific type. In some embodiments, the blockchain technology used comprises at least:

a permission system for identifying and strongly authenticating a stakeholder;

an access control system based on the identities of the users;

an anti-replay mechanism,

Each node maintaining the blockchain having to be located in a secure environment, and the public identity of each node has to be made available to the other nodes and stakeholders within the shared register; the execution of Smart Contract and functions on the blockchain being performed in this secure environment, the ultimate aim of the recording being to create a link, accessible by everyone in the blockchain, in order to make it possible to match the stakeholder and their digital identity by a key pair, public key and private key, or by a certificate, optionally signed by a certified identity management body.

A replay or playback attack is a form of network attack in which a transmission is repeated maliciously by an attacker who intercepted the transmission. This is a type of identity fraud.

In some embodiments, the system comprises at least:

a Manufacturer, using a key diversification system based on diversifiers generated by a diversifier generator, a system for connecting to a blockchain, a system for attributing an identifier to each object leaving manufacturing, and a hardware and software arrangement in order to send, to the blockchain server, a message of publication and of recording of the association DID-Enc($Kp_{man}$, $DIV_c$||DIV_ID).

the system able to ask a service provider to update the blockchain in the database by publication, and association in said blockchain of the pair identifying the object (DID) with the public client key $Kp_{client}$ and the encryption of the public client key $kp_{client}$ and the encrypted diversifiers in order to form the information DID-$kp_{client}$ and Enc($Kp_{client}$,$DIV_c$||DIV_ID) the association DID-DIV and $Kp_{client}$.

The registration, also referred to as personalization, is carried out a single time by the manufacturer. The object updates itself in the steps following manufacture, in this instance in particular when it is bought/handed over.

The diversifier DIV could be not published in the Blockchain, but for security reasons it is. Indeed, this enables the Manufacturer to not store the manufacturing Key pair, and to thus be obliged to recalculate it if needed.

In some embodiments, the object, once it has been bought, is able to ask a service provider to update the blockchain in the database by publication, and association in said blockchain of the pair identifying the object (DID) with the public client key $Kp_{client}$ and the encryption of the public client key $kp_{client}$ and the encrypted diversifiers in order to form the information DID-$kp_{client}$ and Enc($Kp_{client}$,$DIV_c$||DIV_ID) the association DID-DIV and $Kp_{client}$.

In some embodiments, the system comprises at least:

An object provided with computation means and means for storing in memory a program and sufficient data to carry out the following operations: when the object is switched on for the first time, the object auto-enrolls according to the following steps:

Generation of its new symmetric confidentiality key K1c and Identity key K1i by diversification of its former keys K0c, K0i Auto-enrollment by a cryptographic challenge implementing the identity key K0i Sending, by the object to the client, of the two new encrypted diversifiers with the public client key, the sending being carried out by a mechanism outside of the blockchain database, Publication and recording of said new encrypted diversifiers with the public client key in the blockchain database.

In some embodiments, a system for sharing confidentiality keys is established "off chain" in order for service operators to have access to the object and therefore to the related information.

In some embodiments, an identity management system of an identity (ID) service provider implements a blockchain and uses the objects recorded on a network to fulfill application services (AS) in which the information provided by the objects are used, each node of the network of the identity service provider has access to a cryptographic module responsible for the secure storage of the private key of said node, the nodes having clients referred to as Stakeholders, each having their own identity $ID_{act}$ recorded in the blockchain, each object manufacturer is recorded in the blockchain of the identity service provider and the public manufacturing keys of the manufacturers are known to everybody; for each object sold or transferred, each manufacturer provides the identifier of the object and a diversifier used by the manufacturer (DID, DIV) for the calculation of the manufacturing key pairs of each object by the manufacturer, and only the identifier of the object and the public manufacturing key are published in the blockchain, only the private manufacturing key remains stored off-chain, in this instance in the object;

Each object being provided with computation means and means for storing in memory a program and sufficient data to execute the following operations: when the object is switched on for the first time, the object auto-enrolls with the identity service provider by carrying out the following steps:

Generation, in the object, of its new symmetric keys, confidentiality key K1c and Identity key K1i, by diversification of its former keys K0c, K0i;

Auto-enrollment by a cryptographic challenge implementing the identity key.

Sending, by the object to the client, of the two new encrypted diversifiers with the public client key, the sending being carried out by a mechanism outside of the blockchain, Publication and recording of said new encrypted diversifiers with the public client key in the blockchain.

In some embodiments, an object provided with computation means and means for storing in memory a program and sufficient data to execute the following operations: when the object is switched on for the first time, the object auto-enrolls with the identity service provider by carrying out the following steps:

Generation, in the object, of its new symmetric keys, confidentiality key K1c and Identity key K1i, by diversification of its former keys K0c, K0i Auto-enrollment by a cryptographic challenge implementing the identity key.

Sending, by the object to the client, of the two new encrypted diversifiers with the public client key, the sending being carried out by a mechanism outside of the blockchain, Publication and recording of said new encrypted diversifiers with the public client key in the blockchain.

The system thus comprises a secure identity manager based on a blockchain in which the identities, or the processes making it possible to find these identities, are published. The nodes of the shared register thus maintain a blockchain and, by extrapolation, the identity manager.

Thus, a secure, decentralized, automated and multi-stakeholder platform or system may be established for object identity management through the use of a blockchain technology, enabling secure automated access by objects to digital services and the guarantee of protection of the ensuing exchanges.

This system can be established for IoT objects having a low computing capacity, a low storage capacity and/or low energy consumption constraints.

In some embodiments, and to summarize, the manufacturers are recorded in the Blockchain and their respective public keys are known to everybody. They manufacture and personalize Objects with unique identifiers and symmetric keys. For each object, they publish, in the Blockchain, the identifier of the object and the encryption of the diversifiers used for the generation.

Figure 1:
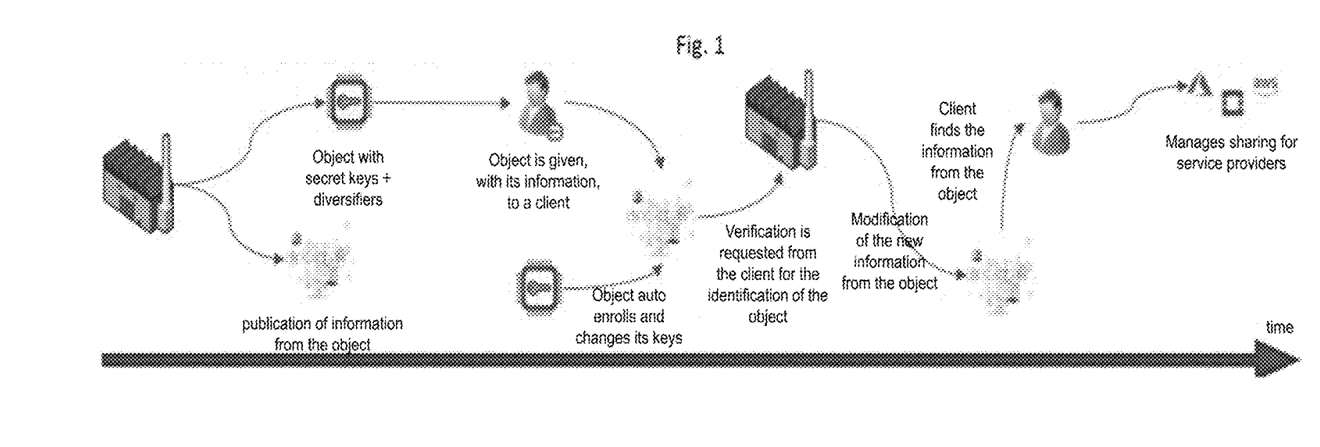
FIG. 1 schematically represents an embodiment of the method.

The IoT objects are liable to only be able to use symmetric cryptography mechanisms. In order to identify themselves, they must use cryptographic challenges, which involve secret keys. The client operates the Object and must therefore know the secret keys, in order to be able to communicate with the Object and manage the access rights. FIG. 1 thus shows this by way of non-limiting example by summing up the different key steps of some embodiments.

Figure 2:
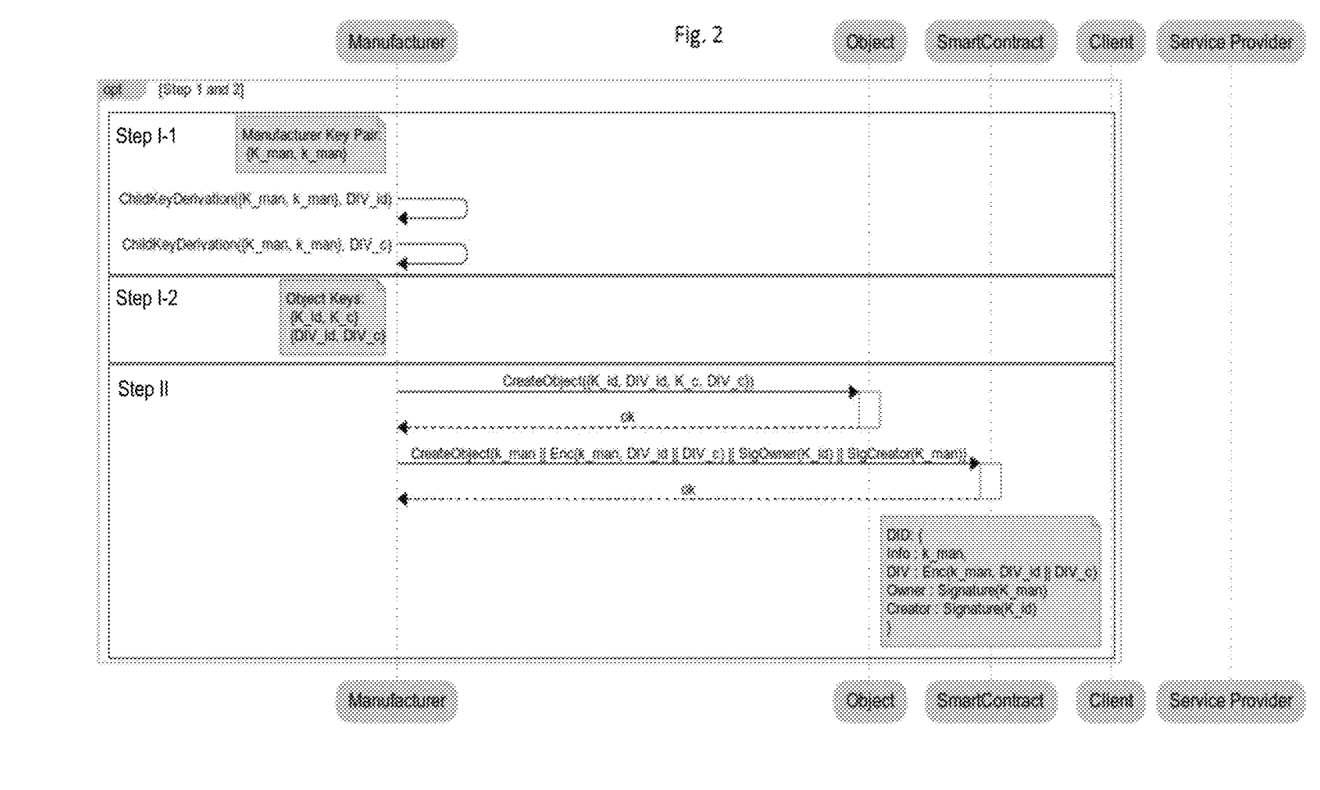
FIG. 2 represents steps a) and b) of the method according to certain embodiments.

More particularly, FIG. 2 shows an example of a non-limiting embodiment of the present invention, wherein steps a) and b) are shown. Step a) relates to the generation of the two symmetric keys by the Manufacturer, which the latter will share with the object, the two symmetric keys being diversified from the Manufacturer key pair and from diversifiers, for example in the form of 128 bit AES keys, the two symmetric keys being composed of a confidentiality key $K0c$ and an identity key $K0i$ (Step I-1), and the initialization of the object with these symmetric keys (Step I-2). Step b) relates to the publication and recording, in the blockchain, of the DID and the encryption of the diversifiers used to obtain the two symmetric keys, to form the information DID-Enc $(k_{pman}, DIV_c\|DIV\_ID)$ (Step II). Thus, the script with a double signature makes it possible to differentiate the owner of the object from the one who created the object. This also makes it possible to monitor that the one who has written this transaction is indeed the one who created the object.

For simplicity, the temporary key pair g', which is one of the possible mechanisms for generating these secret keys, has been purposely excluded from the diagrams and explanations. The same applies for the symmetric keys which are "master keys". All the signature and encryption mechanisms involving them require them to be diversified by their associated diversifiers.

Figure 3:
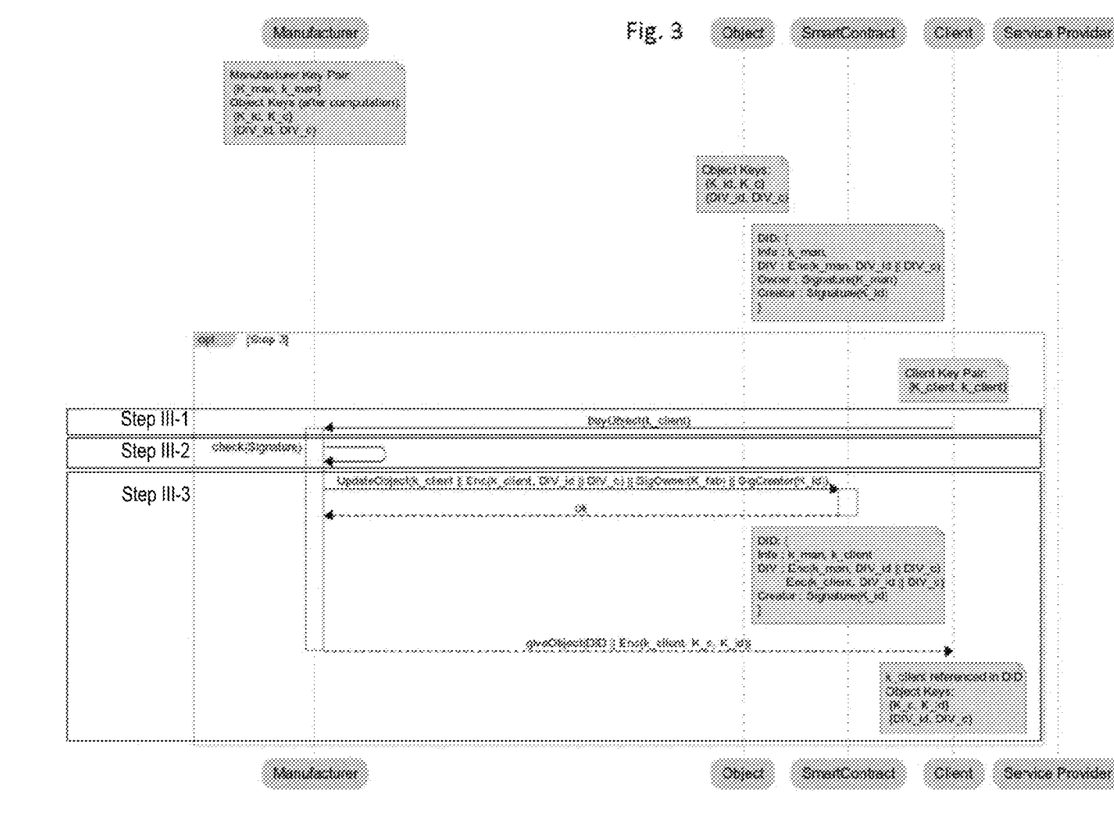
FIG. 3 represents steps c) and d) of the method according to certain embodiments.

FIG. 3 shows an example of a non-limiting embodiment of the present invention, wherein steps c) and d) are shown, corresponding to the steps carried out when a Client buys the object from said Manufacturer (Step III-1). The provision of the data by the Manufacturer to the client by an "off-chain" mechanism is not shown. The proof of ownership of the object is intrinsic, since the owner is the only one to possess the private key associated with the public key referenced. During the exchange between the Client and the Manufacturer, the client proves that they are indeed the owner of the public key by inserting their signature (Step III-2). The Manufacturer updates the shared repository by publishing the public key associated with the Client $Kp_{client}$ and the encryption of the public client key $kp_{client}$ and the encrypted diversifiers to form the information DID-$kp_{client}$ and Enc $(Kp_{client}, DIV_c\|DIV\_ID)$ so that the client can recalculate the values of the keys of the object (Step III-3).

Figure 4:
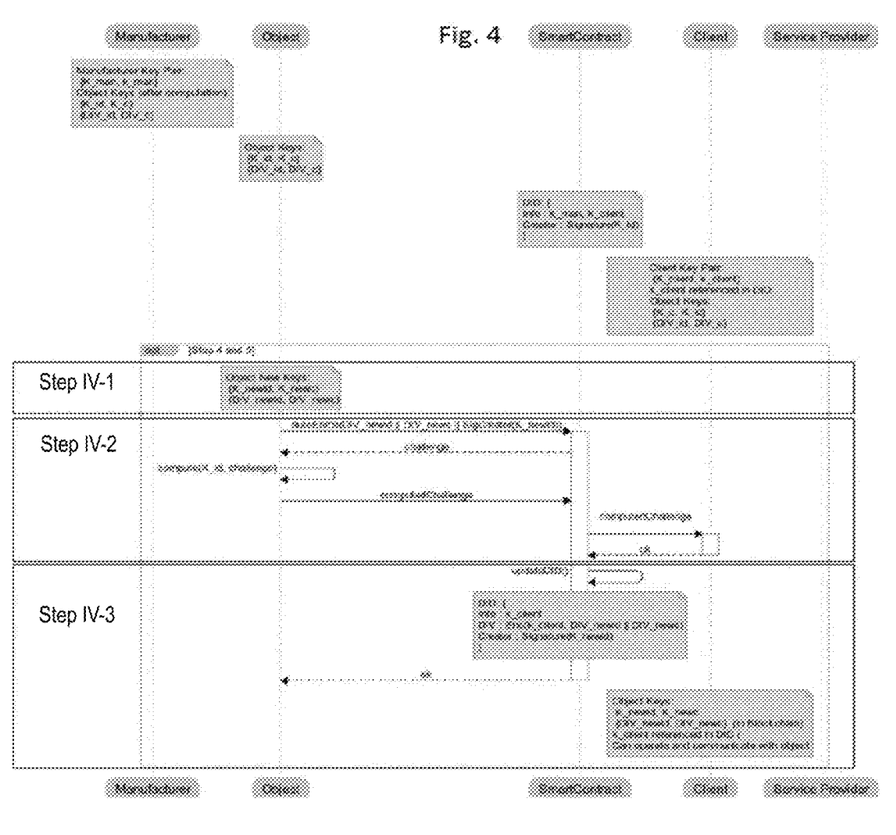
FIG. 4 represents steps e), f), g) and h) of the method according to certain embodiments.

Finally, FIG. 4 shows an example of a non-limiting embodiment of the present invention, wherein steps e), f), g) and h) are shown, corresponding to the steps carried out when the object is switched on for the first time and auto-enrolls. Indeed, once switched on, the object generates new symmetric keys (Step IV-1). The object then auto-enrolls by a cryptographic challenge implementing the identity key $K0i$ (Step IV-2). The sending by the object, to the client of the two new encrypted diversifiers with the public client key, carried out by a mechanism outside of the blockchain, referred to as "off-chain", is not shown in the figure. Finally, the publication (Step IV-3) to update the blockchain with said new encrypted diversifiers with the public client key.

The auto-enrollment of the object occurs by a gateway provided by the manufacturer; this is the only information known of the object when it is started up.

It will be readily apparent from reading the present application that the particular features of the present invention, as generally described and illustrated in the figures, can be arranged and designed in a wide variety of different configurations. Thus, the description of the present invention and the figures relating thereto are not intended to limit the scope of the invention but merely represent selected embodiments.

A person skilled in the art will understand that the technical features of a given embodiment may in fact be combined with features of another embodiment unless the opposite is explicitly mentioned or it is not obvious that these features are incompatible. In addition, the technical features described in a given embodiment may be isolated from the other features of this mode unless the opposite is explicitly stated.

It must be obvious to those skilled in the art that the present invention enables embodiments in numerous other specific forms without departing from the field defined by the scope of the appended claims; they must be considered as illustrative and the invention must not be limited to the details given above.

The invention claimed is:

1. A communication method for secure management of keys and identities of an object manufactured by a manufacturer having a manufacturer key pair of a public key Kp, and private or secret key Ks ($Ks_{man}$, $Kp_{man}$), and a client having a client key pair ($Ks_{client}$, $Kp_{client}$), wherein the communication method is carried out at least partially on a blockchain database comprising a blockchain in a database wherein the blockchain database comprises a decentralized blockchain database, the communication method comprising:

generating, by the manufacturer, two symmetric keys comprising two diversified symmetric keys from their key pair and from diversifiers, as 128 bit Advanced Encryption Standard (AES) keys, the two symmetric keys being composed of a confidentiality key $K0c$ and an identity key $K0i$, then sharing of said two symmetric keys with the object;

publishing and recording, in the blockchain database, a decentralized identifier (DID) of the object and a diversifier encryption used to obtain the two symmetric keys by a public key $Kp_{man}$ and associating a pair identifying the object with encryption of the public key $Kp_{man}$ and encrypted diversifiers to form information; and when the manufacturer provides the Client with the object, the communication method further comprises
  providing, by the manufacturer of the object, the decentralized identifier (DID) of the object, and the two symmetric keys comprising the confidentiality key K0c and the identity key K0i, the two symmetric keys being encrypted by public client key kp$_{client}$, to the client, by an external blockchain mechanism, as an off-chain;
  updating the blockchain of the database by publication, and association in the blockchain, of the pair identifying the object with the public client key Kp$_{client}$ and the encryption of the public client key kp$_{client}$ and the encrypted diversifiers to form updated information to enable values of object keys to be recalculated; and
wherein when the object is initially switched on, the object automatically enrolls by
  generating new symmetric keys, a confidentiality key K1c and an identity key K1i, by diversification of the confidentiality key K0c and the identity key K0i;
  auto-enrolling of the object by a cryptographic challenge implementing the identity key K1i;
  sending by the object to the client of two new encrypted diversifiers with the public client key, the sending being carried out by said off-chain;
  publishing and recording of said two new encrypted diversifiers with the public client key in the blockchain.

2. The communication method according to claim 1, which further comprises recording a manufacturer identifier in the blockchain by the manufacturer and publishing a public manufacturer key (Kp$_{man}$) by associating said public manufacturer key with the manufacturer identifier prior to the generating of manufacturing key pairs by the manufacturer.

3. The communication method according to claim 1 further comprising using a key pair generator that is based on hierarchical key wallets to provide manufacturer and client key pairs.

4. The communication method according to claim 1, further comprising generating, by the manufacturer, the two symmetric keys using an Integration Encryption Scheme (IES) or an Elliptic Curve Integrated Encryption Scheme (ECIES), and generating by the manufacturer a temporary key pair having a public part, wherein the public part of which enables deriving said two symmetric keys.

5. The communication method according to claim 1, wherein the object is transferred from one owner to another by reiterating the updating the blockchain of the database and the generating new symmetric keys.

6. The communication method according to claim 1, further comprising sharing or managing rights to the object using verifiable credentials, or by receiving a request from Service Providers and further comprising validating by an owner.

7. The communication method according to claim 1, further comprising using a Zero Knowledge Proof (ZKP) system that is established within a smart contract, and giving said information without revealing values thereof.

8. A system comprising: a computer and memory configured to implement a communication method for secure management of keys and identities of an object manufactured by a manufacturer having a manufacturer key pair of a public key Kp, and private or secret key Ks (Ks$_{man}$, Kp$_{man}$), and a client having a client key pair (KS$_{client}$, KP$_{client}$), wherein the communication method is carried out at least partially on a blockchain database comprising a blockchain in a database wherein the blockchain database comprises a decentralized blockchain database, the communication method comprising
  generating, by the manufacturer, two symmetric keys comprising two diversified symmetric keys from their key pair and from diversifiers, as 128 bit Advanced Encryption Standard (AES) keys, the two symmetric keys being composed of a confidentiality key K0c and an identity key K0i, then sharing of said two symmetric keys with the object;
  publishing and recording, in the blockchain database, a decentralized identifier
  (DID) of the object and a diversifier encryption used to obtain the two symmetric keys by a public key Kp$_{man}$ and associating a pair identifying the object with encryption of the public key Kp$_{man}$ and encrypted diversifiers to form information; and
when the manufacturer provides the Client with the object, the communication
  method further comprises
    providing, by the manufacturer of the object, the decentralized identifier (DID) of the object, and the two symmetric keys comprising the confidentiality key K0c and the identity key K0i, the two symmetric keys being encrypted by public client key kp$_{client}$, to the client, by an external blockchain mechanism, as an off-chain;
    updating the blockchain of the database by publication, and association in the blockchain, of the pair identifying the object with the public client key Kp$_{client}$ and the encryption of the public client key kp$_{client}$ and the encrypted diversifiers to form updated information to enable values of object keys to be recalculated; and
wherein when the object is initially switched on, the object automatically enrolls by
  generating new symmetric keys, a confidentiality key K1c and an identity key K1i, by diversification of the confidentiality key K0c and the identity key K0i;
  auto-enrolling of the object by a cryptographic challenge implementing the identity key K1i;
  sending by the object to the client of two new encrypted diversifiers with the public client key, the sending being carried out by said off-chain;
  publishing and recording of said two new encrypted diversifiers with the public client key in the blockchain;
the system comprising:
a blockchain server,
the manufacturer, that uses a key diversification system based on said diversifiers
  generated by a diversifier generator,
    wherein the system having the computer and memory is configured to connect to said blockchain,
    wherein the system having the computer and memory is configured to attribute an identifier to each object leaving manufacturing, and
  the computer arrangement configured to send, to the blockchain server, a message of publication and of recording of the association.

9. A system comprising: a computer and memory configured to implement a communication method for secure management of keys and identities of an object manufactured by a manufacturer having a manufacturer key pair of a public key Kp, and private or secret key Ks (Ks$_{man}$, Kp$_{man}$), and a client having a client key pair (Ks$_{client}$, $Kp_{client}$), wherein the communication method is carried out at least partially on a blockchain database comprising a blockchain in a database wherein the blockchain database comprises a decentralized blockchain database, the communication method comprising     generating, by the manufacturer, two symmetric keys comprising two diversified symmetric keys from their key pair and from diversifiers, as 128 bit Advanced Encryption Standard (AES) keys, the two symmetric keys being composed of a confidentiality key KOc and an identity key KOi, then sharing of said two symmetric keys with the object;

publishing and recording, in the blockchain database, a decentralized identifier     (DID) of the object and a diversifier encryption used to obtain the two symmetric keys by a public key $Kp_{man}$ and associating a pair identifying the object with encryption of the public key $Kp_{man}$ and encrypted diversifiers to form information; and     when the manufacturer provides the Client with the object, the communication     method further comprises         providing, by the manufacturer of the object, the decentralized identifier (DID) of the object, and the two symmetric keys comprising the confidentiality key K0c and the identity key K0i, the two symmetric keys being encrypted by public client key $kp_{client}$, to the client, by an external blockchain mechanism, as an off-chain;

updating the blockchain of the database by publication, and association in the blockchain, of the pair identifying the object with the public client key $Kp_{client}$ and the encryption of the public client key $kp_{client}$ and the encrypted diversifiers to form updated information to enable values of object keys to be recalculated;

the system comprising:

the computer and memory that store a program and sufficient data configured to when the object is initially switched on, the object automatically enrolls through     generation of new symmetric keys comprising a confidentiality key K1c and an identity key K1i, by diversification of the confidentiality key K0c and the identity key K0i, auto-enrollment by a cryptographic challenge implementing the identity key K0i, transmission, by the object to the client, of two new encrypted diversifiers with the public client key, the transmission being carried out by a mechanism outside of the blockchain database, publication and recordation of said two new encrypted diversifiers with the public client key in the blockchain database.

10. The system according to claim 8, wherein the system is further configured to share said confidentiality key by said off-chain, in order for service operators to have access to the object and therefore to related information.

* * * * *